(12) United States Patent
Goodwin et al.

(10) Patent No.: US 6,179,209 B1
(45) Date of Patent: Jan. 30, 2001

(54) CREDIT CARD READER FOR INTERNET-BASED COMMERCE

(75) Inventors: Joel Gerard Goodwin, Austin; Scott Harlan Isensee, Georgetown; John Martin Mullaly, Austin, all of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 08/974,096

(22) Filed: Nov. 19, 1997

(51) Int. Cl.[7] .................................................. G06K 7/00
(52) U.S. Cl. ........................................... 235/486; 235/483
(58) Field of Search ..................................... 235/449, 486, 235/483, 484, 485, 488, 492, 487, 380

(56) References Cited

U.S. PATENT DOCUMENTS

| | | | |
|---|---|---|---|
| 5,159,182 | * 10/1992 | Eisele ..................................... | 235/492 |
| 5,457,590 | * 10/1995 | Barrett et al. ..................... | 235/492 X |
| 5,471,038 | * 11/1995 | Eisele et al. ...................... | 235/492 X |
| 5,500,517 | * 3/1996 | Cagliostro ............................ | 235/486 |
| 5,822,190 | * 10/1998 | Iwasaki ............................. | 235/492 X |

OTHER PUBLICATIONS

JP3–37652—no English translation but unofficial English translation of Abstract is attached.
JP06243628—no English translation but official English translation of Abstract is attached.

* cited by examiner

Primary Examiner—Karl D. Frech
(74) Attorney, Agent, or Firm—Richard A. Henkler; Felsman, Bradley, Vaden, Gunter & Dillon, LLP

(57) ABSTRACT

A data processing system has a reader device adapted to read information residing on a first type of storage article (such as a floppy diskette), and a holder is provided which is substantially identical in size and shape to the first type of storage article, but allows the reader device to read a card which bears machine-readable information, such as a credit card. The holder can have a slot therein for receiving the card, which is aligned within the holder to position a portion of the information medium at an access area of the holder. The machine-readable information can be, for example, encoded on a magnetic strip on the card. The system allows network-based transactions which read from the card as well as write to it.

9 Claims, 5 Drawing Sheets

CREDIT CARD READER FOR INTERNET-BASED COMMERCE

BACKGROUND OF THE INVENTION

1. Field of the Invention

The present invention generally relates to computer systems, particularly to an apparatus for accessing information residing on a substrate or medium, wherein the information is to be transmitted across a computer network, and more particularly to a device and system for reading from or writing to an article bearing commercial information, such as a credit card, for Internet-based commerce.

2. Description of Related Art

A generalized client-server computing network 2 is shown in FIG. 1. Network 2 has several servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at workstation clients 12. A client is a member of a class or group of computers or computer systems that uses the services of another class or group to which it is not related. Clients 12 can also be stand-alone computer systems (like personal computers, or PCs), or "dumber" systems adapted for limited use with network 2 (like network computers, or NCs). As used herein, "PC" generally refers to any multi-purpose computer adapted for use by a single individual, regardless of the manufacturer, hardware platform, operating system, etc. A single, physical computer can act as both a server and a client, although this implementation occurs infrequently.

The information provided by a server can be in the form of programs which run locally on a given client 12, or in the form of data such as files used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. In the context of a computer network such as the Internet, a client is a process (i.e., a program or task) that requests a service which is provided by another program. The client process uses the requested service without having to "know" any working details about the other program or the service itself. Based upon requests by the user, a server presents filtered electronic information to the user as server responses to the client process.

Conventional protocols and services have been established for the Internet which allow the transfer of various types of information, including electronic mail, simple file transfers via FTP, remote computing via TELNET, gopher searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the object pathname. For example, the URL "http://www.uspto.gov" (home page for the U.S. Patent & Trademark Office) specifies a hypertext transfer protocol ("http") and a pathname of the server ("www.uspto.gov"). The server name is associated with a unique numeric value (a TCP/IP address, or "domain").

The Internet began as an infrastructure for a communications path between researchers at universities and defense contractors, but it has quickly become a medium for commercial transactions as well. These transactions not only include passive marketing techniques such as advertising and promotional activities, but further include active sales techniques which can culminate in the immediate (i.e., real-time) consumer purchase of goods and services. Such Internet-based commerce often relies on credit cards and similar banking devices.

Several security issues arise with regard to the use of credit cards on the Internet (or on any other commercial network). Since data packets which are transmitted along the Internet often pass through many servers, there are plenty of opportunities for unscrupulous individuals to "eavesdrop" on communications of nearly every sort. For many years, transmission of a credit card number from a consumer to a vendor using the Internet was consequently risky (whether the communication was via the WWW, e-mail, etc.). Various encryption schemes have since been developed to prevent interception of such transactions, but there is still a high risk of credit card fraud because a thief only needs to know a credit card number in order to submit a transaction; in other words, it is not necessary that the thief currently have physical possession of the card. The credit card number might be obtained, for example, from a receipt for an earlier purchase.

In face-to-face purchases using a credit card (or a similar article such as a bank debit card), there is a high degree of security because the purchaser must physically tender the card to the clerk. These cards are difficult to forge because data is encoded, e.g., on a magnetic stripe on the card, and they often include complicated anti-counterfeit measures. It takes a very sophisticated thief to be able to manufacture and encode a credit card, or else requires that the thief somehow obtain possession of the card, which is much harder to do than simply finding out the card number.

The risk of a thief using a credit card number, while not actually having the card, exists in other situations besides electronic commerce. Telephone sales are subject to this type of fraud, but there is still a higher degree of security associated with telephone transactions than with network or "on-line" transactions, because the telephone operator (salesperson) is able to interrogate the purchaser and obtain additional information (such as additional numbers that might be printed on the physical card but not appearing on any hard-copy receipt). This additional confirmation is not possible with conventional tools for implementing Internet-based commerce.

Many billions of credit card transactions are made annually on the WWW, and the number of transactions is expected to grow very rapidly. It would, therefore, be desirable to bring the same degree of security to Internet purchases that face-to-face purchases have, using a standard credit card for commercial transactions. It would be furthermore advantageous if this capability could be accomplished with little or no additional expense or equipment requirements.

SUMMARY OF THE INVENTION

It is therefore one object of the present invention to provide an improved method of communicating across a computer network.

It is another object of the present invention to provide such a method wherein the communication involves a commercial transaction executed on the Internet.

It is yet another object of the present invention to provide such a method that requires the use of an actual credit card (or other physical article bearing machine-readable information) to carry out the transaction.

The foregoing objects are achieved in a system generally comprising a data processing system having a reader device adapted to read information residing on a first type of storage article, a card which bears machine-readable information in a medium that can read by the reader device, a holder substantially identical in size and shape to the first type of storage article, and program means allowing the data processing system to use the reader device to read the machine-readable information when the card is inserted in the holder and the holder is inserted in the reader device. In one embodiment, the holder has a slot therein for receiving the card, and means for aligning the card within the holder to position a portion of the information medium at an access area of the holder. The machine-readable information can be, for example, encoded on a magnetic strip on the card, and the card can be a credit card, debit card, ATM card, smart card, etc. The software can be further adapted to write information to the card.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
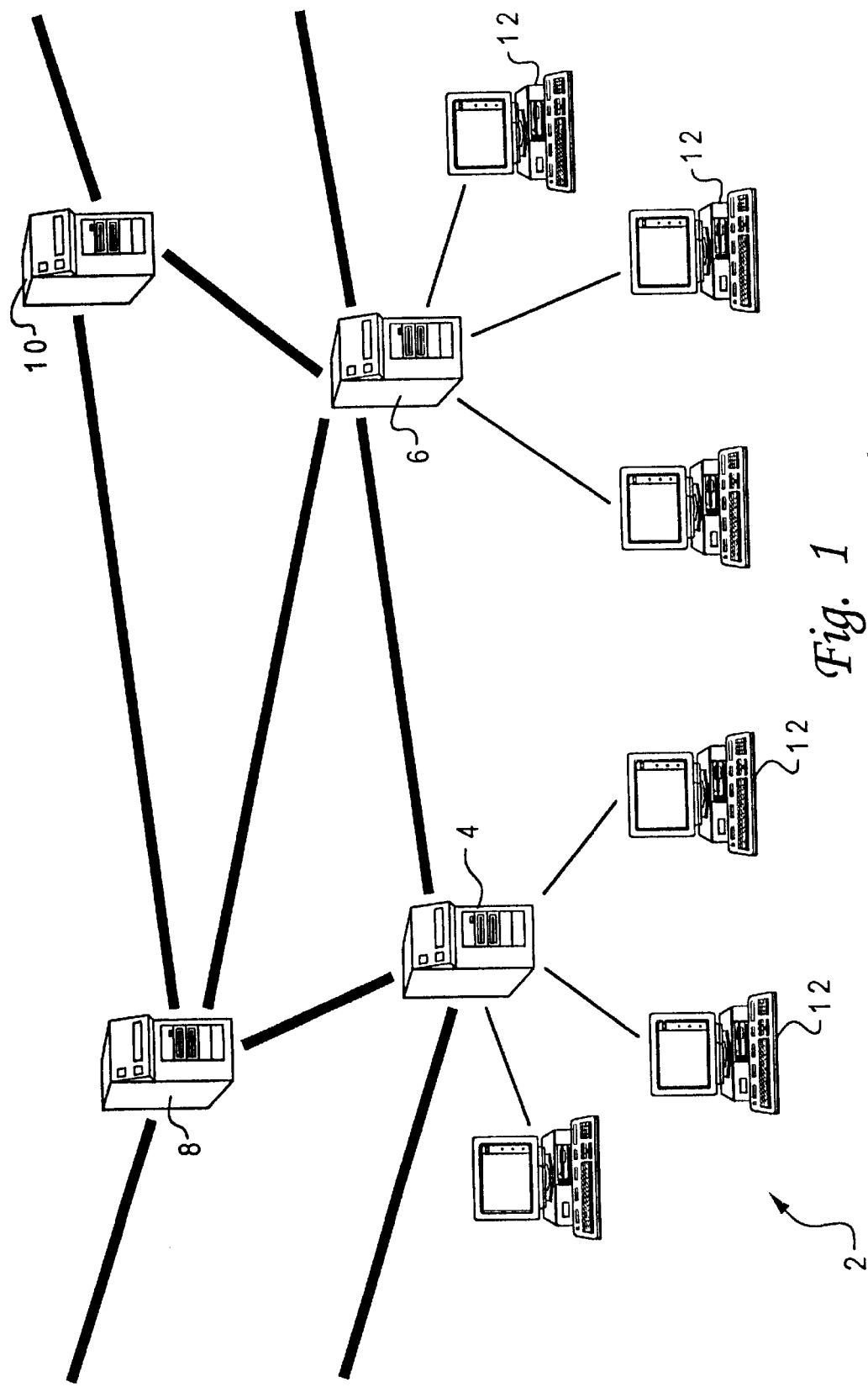
FIG. 1 is a diagram of a conventional computer network, including interconnected servers and workstation clients.

The present invention is directed to a method of communicating information across a computer network, such as the network of FIG. 1, and particularly to a device and system for performing secure credit card transactions on the World Wide Web. The invention may, however, be implemented in other networks besides the Internet, and for uses other than credit-card transactions, as explained further below. Therefore, while the present invention may be understood with reference to FIG. 1, this reference should not be construed in a limiting sense.

Figure 2:
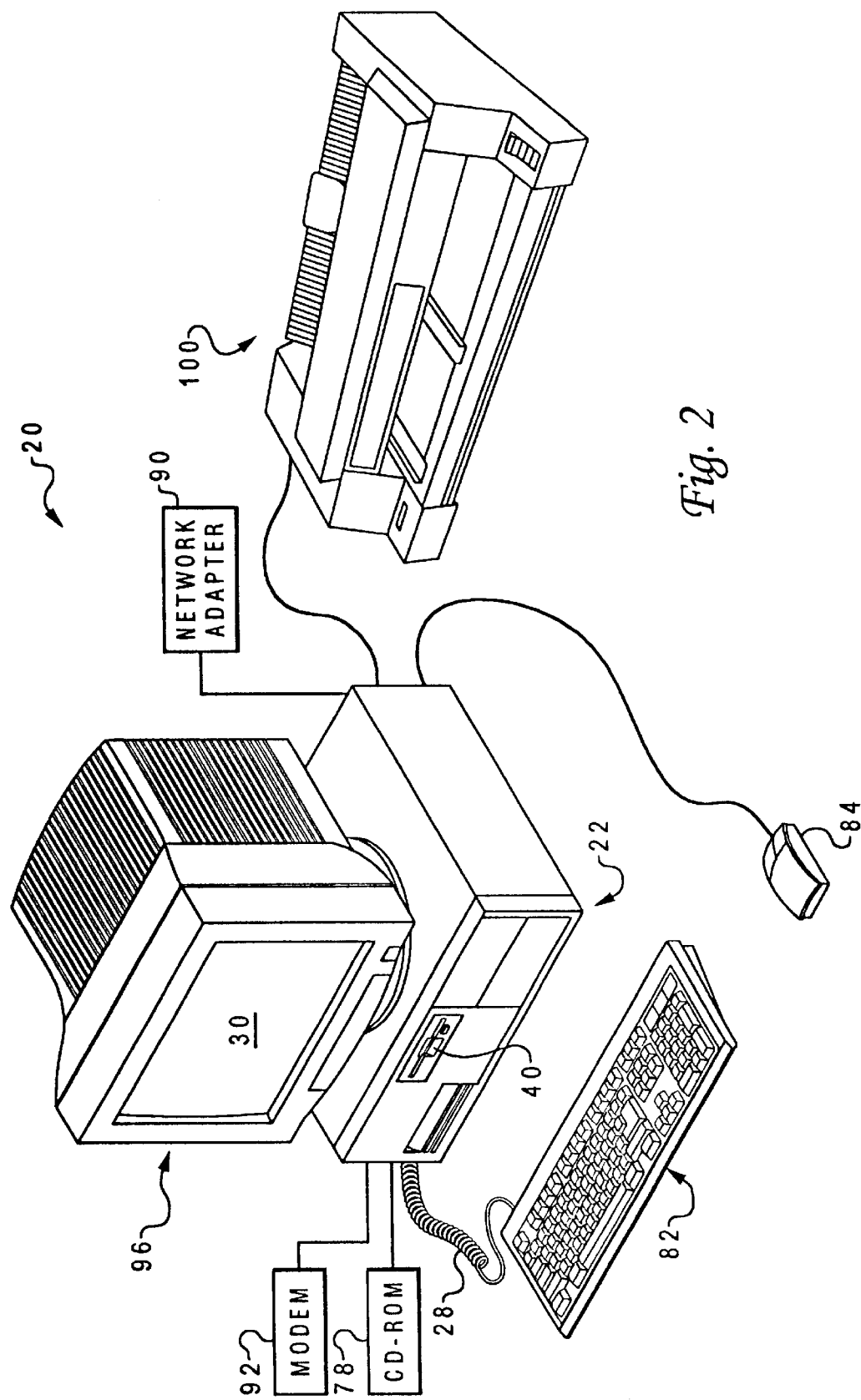
FIG. 2 is an illustration of one embodiment of a data processing system in which the present invention can be practiced.

With further reference to FIG. 2, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 3:
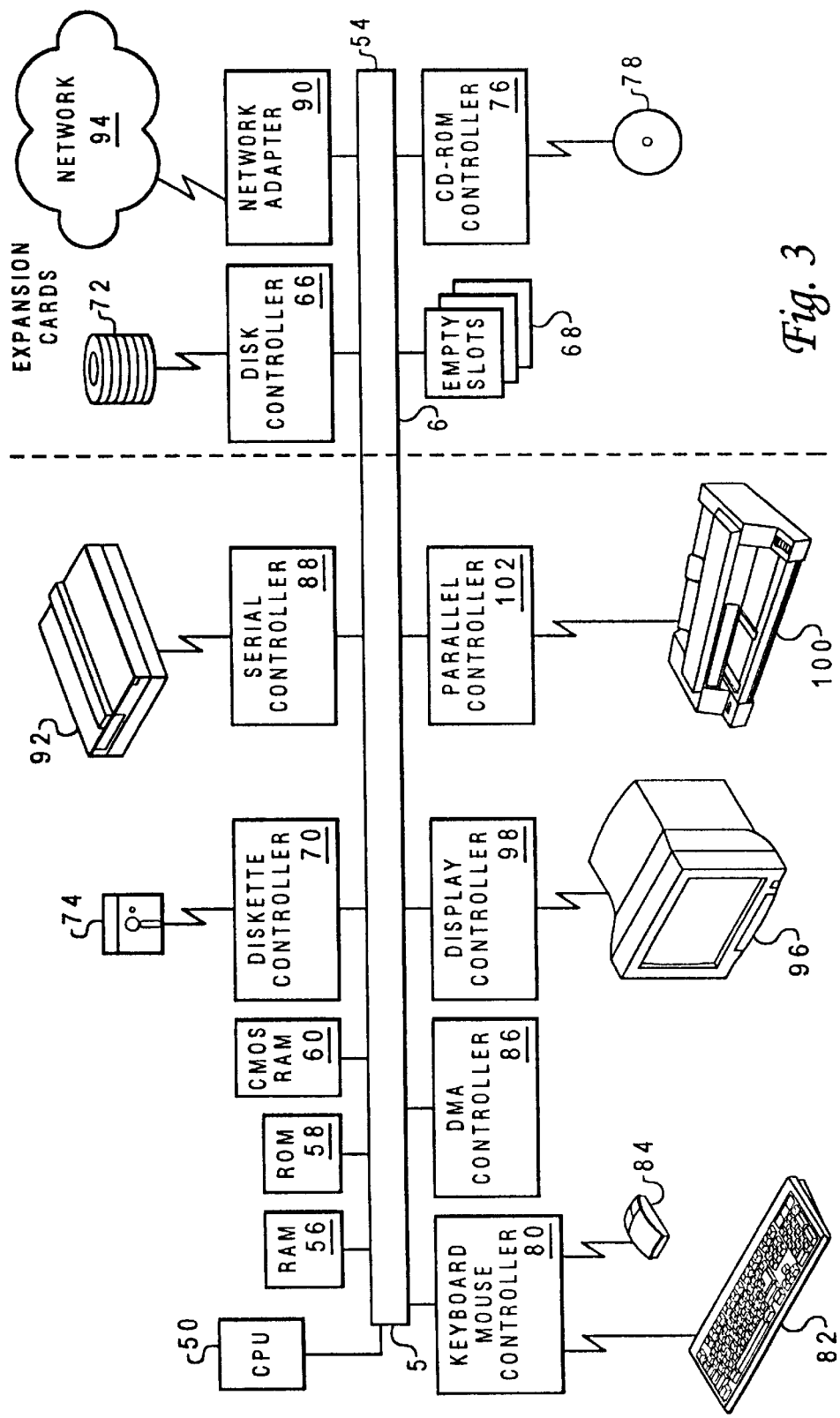
FIG. 3 is a high-level block diagram illustrating selected components that can be included in the data processing system of FIG. 2 according to the teachings of the present invention.

Reference now being made to FIG. 3, a high level block diagram is shown illustrating selected components that can be included in the data processing system 20 of FIG. 2 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 3, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 3. Those skilled in the art will appreciate that a data processing system constructed in accordance with the present invention may have multiple components selected from the foregoing, including even multiple processors.

Figure 4:
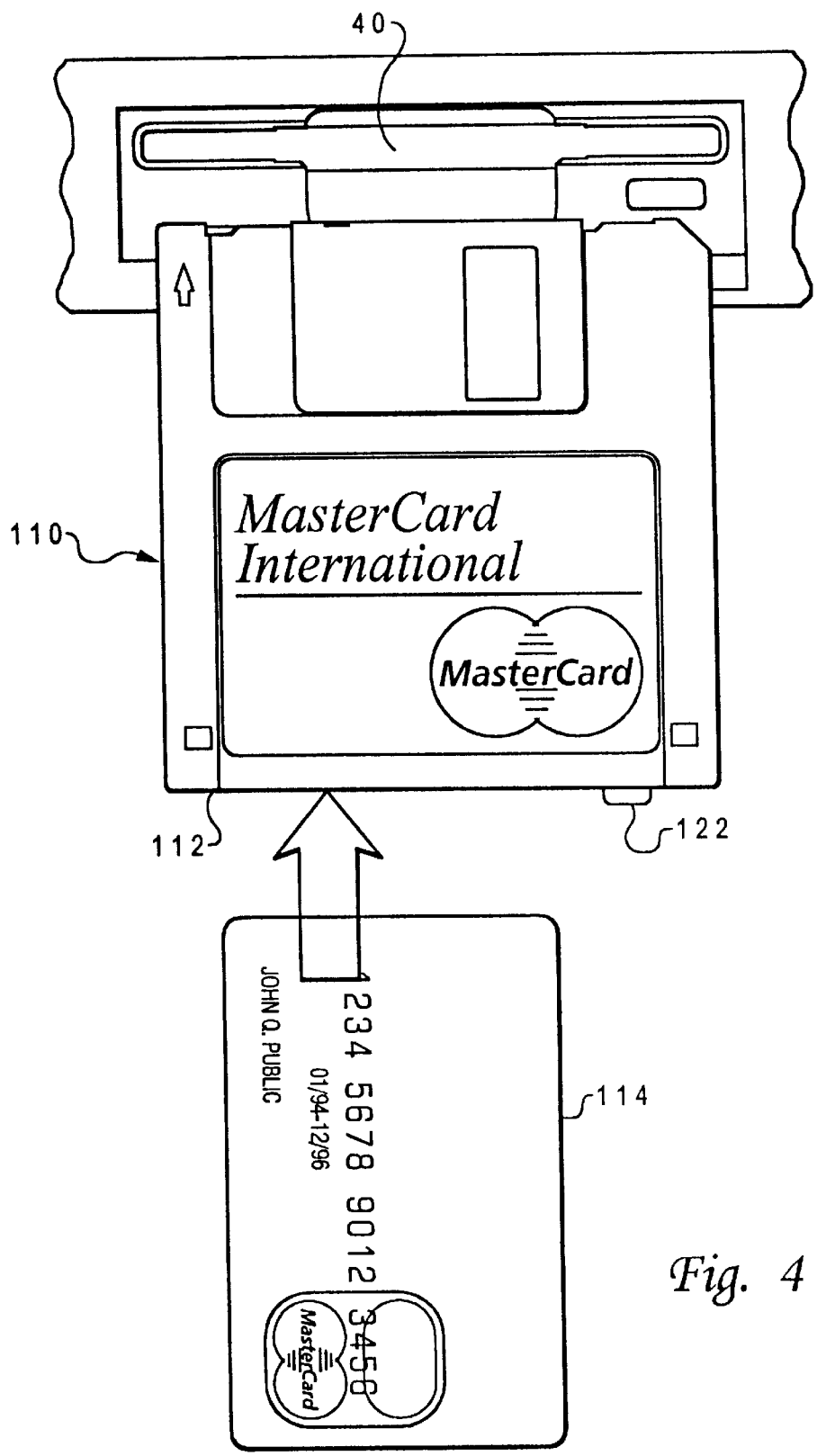
FIG. 4 is a front elevational view depicting the use of a credit card and credit card holder which allows a magnetic stripe of the credit card to be read by a computer diskette drive in accordance with the present invention.

Referring now to FIG. 4, one embodiment of the present invention allows data processing system 20 to use floppy drive 40 to read a credit card (or other substrate) as part of a network transaction. A credit card holder 110 is provided in the shape of a 3.5" diskette which is compatible with floppy drive 40. Holder 110 has a slot 112 along one edge thereof, and a credit card 114 can be inserted through slot 112 in the diskette proxy. When card 114 is fully inserted in holder 110, and when holder 110 is inserted into drive 40, the magnetic stripe 116 of credit card 114 is aligned with a read head (not shown) inside the diskette drive, by appropriately positioned walls or guides formed inside holder 110.

Figure 5:
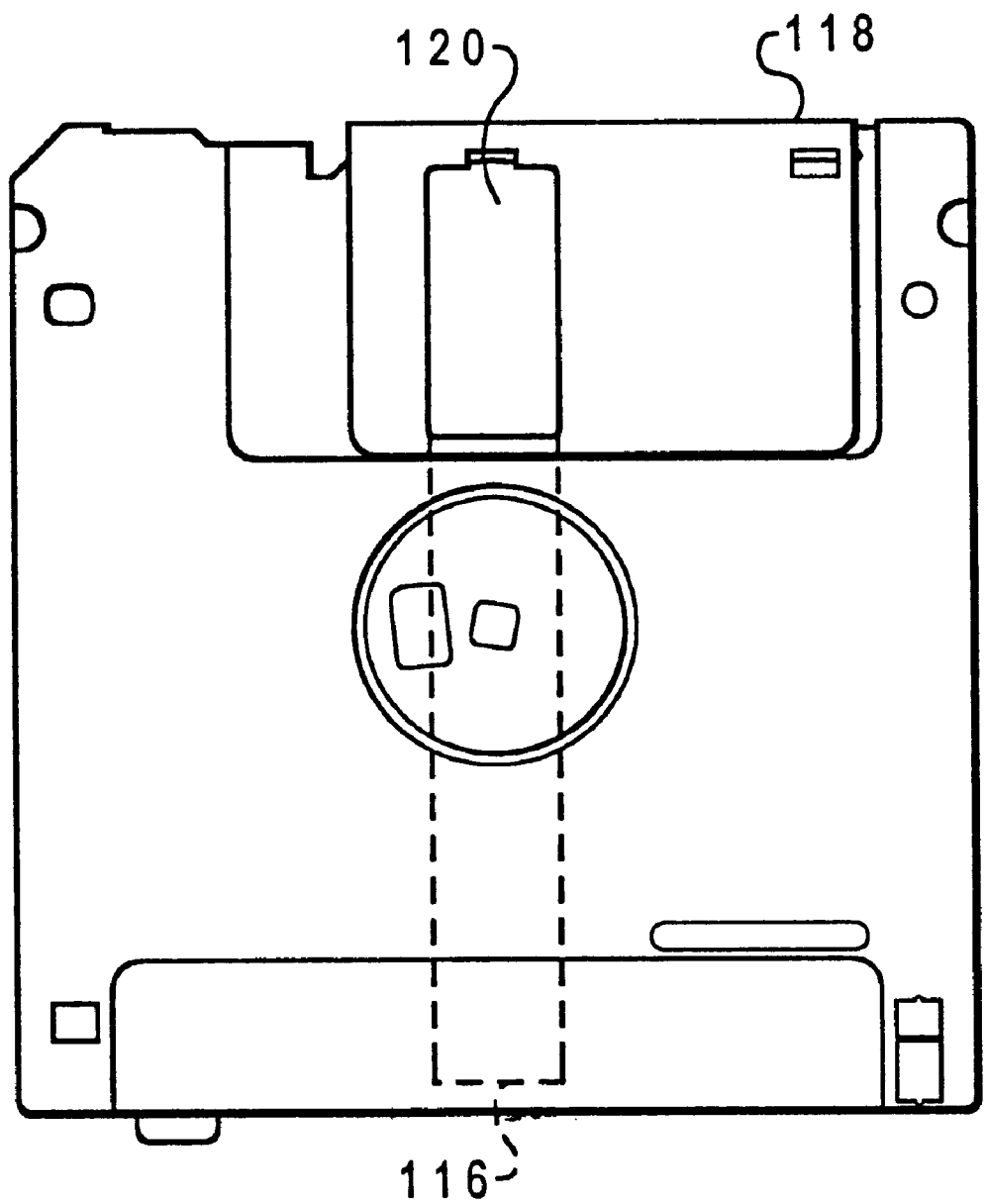
FIG. 5 is a rear elevational view depicting the credit card holder of FIG. 4 with the protective sliding shutter moved to the open position, revealing the magnetic stripe of the credit card in the read/write window.

FIG. 5 is a rear elevational view depicting credit card holder 110 with its protective sliding shutter or cover 118 moved to an open position. In this position, a portion of magnetic stripe 116 of credit card 114 is visible in a read/write window 120 of cover 118. A head positioning motor (not shown) of diskette drive 40 advances the read head across the exposed portion of magnetic stripe 116 to read the information. Although only a portion of magnetic stripe 116 is accessible to the read head (through cutout 120), data is encoded multiple times on a typical credit card stripe (e.g., 8 times along its length), so it is not necessary to read the entire length of the stripe.

Software to enable access to and interpretation of the data can be loaded on data processing system 20 and executed by CPU 50 to control reading from (and writing to) a card via disk drive 40. In addition to providing control signals for the read head, the software can also provide control signals to indicate that there is no rotating disk in the drive, i.e., disk drive 40 should turn off the spindle/capstan motor that would normally cause a floppy diskette to rotate.

Holder 110 is preferably provided with means for retaining the card or substrate within the holder. Suitable means include, for example, a detent mechanism or spring-loading of a retention pin. A simple linkage system within holder 110 can then be used to release the credit card from holder 110, by pushing an eject button 122. Holder 110 can be formed of any durable material, preferably an inexpensive polymer.

The software which resides on data processing system 20 that is used to access the machine-readable information on the credit card can be stand-alone or networked. A stand-alone program might be application-independent (by employing an application programming interface (API) to provide the credit card information to other applications in a pre-defined manner), or part of a specific application that uses the information locally (such as a program that allows a retailer to use a computer in lieu of a conventional credit card approval device). A networked implementation can be used for transmission of the credit card information across a computer network, particularly for Internet-based electronic commerce. This implementation can use conventional encryption schemes to prevent interception of the transaction, such as Pretty Good Privacy (PGP).

The software may be distributed on, e.g., magnetic media (which could be sold as part of a WWW browser, or on a diskette accompanying the holder), or could be made available for downloading from the Internet, another network source, or a BBS. Different versions of the software can be provided with drivers that are slightly different, for different operating systems or hardware platforms. The software can be easily adapted for use with existing operating systems or graphical user interfaces (GUIs), such as OS/2 (a trademark of IBM). It could optionally require manual entries for verification or additional confirmation (e.g., entering a 4-digit number that is sometimes printed on a conventional credit card but not physically embossed on the card or encoded on the magnetic strip).

The present invention imparts a much higher degree of security to Internet purchases than is provided by conventional credit card transactions. This benefit is achieved using a standard credit card, with very slight expense requirements, specifically, the cost of holder 110 (relatively minor) and the cost of the software (which has a marginal cost of practically nothing). Of course, the invention is equally applicable to other types of cards, like bank debit cards, automatic teller machine (ATM) cards, etc.

The present invention may also be applied to other classes of information which might be transmitted as part of a network-based transaction. For example, driver's licenses can be provided with a similar magnetic stripe having a tremendous amount of information, which can be used for identity verification (separate from, or as a part of, some commercial transaction such as one using a credit card that is also scanned). Moreover, since the diskette reader is a read/write device, data could also be written to the card. It may be possible to thereby retrofit credit cards (or other types of cards) by adding data or changing the format. This capability is particularly suited for so-called "smart cards" that have a cash value which varies with use. Card holders can have write protect tabs that are fixed (in the case of holders that are to be used only with credit cards that are to be read from but not written to), or movable (in the case of holders that might house cards whose data will be altered by write operations).

Those skilled in the art will appreciate that the present invention may be implemented in a wide variety of embodiments other than that illustrated. The credit card holder could be another shape or size and have a different style of protective cover or access window, depending upon the particular reader device being used. For example, the invention can be implemented with an alternative holder (not shown) adapted for use with the disk drive sold under the trademark "zip" by Iomega. Also, the invention might involve non-magnetic media. For example, a card could be provided with optically encoded information, which is read using a holder adapted for a CD-ROM drive.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the present invention is particularly directed at Internet-based commerce, it is applicable to transactions across any type of computer network. It is therefore contemplated that such modifications can be made without departing from the spirit or scope of the present invention as defined in the appended claims.

What is claimed is:

1. An article for allowing a computer system to access machine-readable information residing on a substrate, the article comprising:

a holder member having a size and shape adapted for a reader device of the computer system, and further having a slot therein for removably receiving the substrate, wherein said holder member has a protective cover attached thereto which is movable between an open position wherein said access area is accessible and a closed position wherein said access area is not accessible; and means for aligning the substrate within said holder member to position a portion of the substrate having the machine-readable information at an access area of said holder member and allow the reader device to directly access the machine-readable information.

2. The article of claim 1 wherein said holder member includes means for releasably retaining the substrate in said slot.

3. The article of claim 2 wherein said means for releasably retaining the substrate includes a button member used to eject the substrate from said slot.

4. The article of claim 1 wherein said protective cover is slidably mounted along a portion of said holder member, and has a cutout therein forming an access window.

5. The article of claim 4 wherein:

the information is encoded on a magnetic strip of the substrate; and said aligning means aligns the magnetic strip of the substrate with said access window in said open position.

6. A system for carrying out network-based transactions, comprising:

a data processing system having a reader device adapted to directly read information residing on a first type of storage article;

a card which bears machine-readable information in a medium that can be directly read by said reader device;

a holder substantially identical in size and shape to said first type of storage article, wherein said holder has a slot therein for receiving said card, and means for aligning said card within said holder to position a portion of said medium of said card at an access area of said holder, said holder further having a protective cover attached thereto which is movable between and open position wherein said access area is accessible and closed position wherein said access area is not accessible; and program means allowing said data processing system to use said reader device to directly read said machine-readable information when said card is inserted in said holder and said holder is inserted in said reader device.

7. The system of claim 6 wherein said machine-readable information is encoded on a magnetic strip on said card.

8. The system of claim 6 wherein:

said reader device is further adapted to write information to said first type of storage article; and said program means further allows said data processing system to use said reader device to directly write information to said medium when said card is inserted in said holder and said holder is inserted in said reader device.

9. The system of claim 6 wherein said card is a credit card.

* * * * *